United States Patent [19]

Yamaguchi et al.

[11] Patent Number: 4,976,553
[45] Date of Patent: Dec. 11, 1990

[54] VERY SMALL DISPLACEMENT ENLARGEMENT MECHANISM AND PRINTING HEAD USING THE SAME

[75] Inventors: Morio Yamaguchi; Yasunori Kudoh; Takashi Nakazato, all of Tokyo, Japan

[73] Assignee: Max Co., Ltd., Tokyo, Japan

[21] Appl. No.: 281,438

[22] Filed: Dec. 8, 1988

[30] Foreign Application Priority Data

| Dec. 9, 1987 | [JP] | Japan | 62-311558 |
| Dec. 9, 1987 | [JP] | Japan | 62-311359 |
| Jun. 6, 1988 | [JP] | Japan | 63-138704 |
| Jun. 8, 1988 | [JP] | Japan | 63-141361 |
| Aug. 29, 1988 | [JP] | Japan | 63-214078 |
| Aug. 31, 1988 | [JP] | Japan | 63-218107 |
| Nov. 4, 1988 | [JP] | Japan | 63-278985 |

[51] Int. Cl.⁵ .................. B41J 2/295; H01L 41/04
[52] U.S. Cl. .................. 400/124; 400/157,2; 101/93.05; 310/328
[58] Field of Search .................. 310/323, 328; 101/93.04, 93.05, 93.48; 400/121, 124, 157.2

[56] References Cited

U.S. PATENT DOCUMENTS

| 3,614,486 | 10/1971 | Smiley | 101/212 X |
| 4,407,591 | 10/1983 | Adamoli | 400/124 |
| 4,518,887 | 5/1985 | Yano | 310/328 |
| 4,547,086 | 10/1985 | Matsumoto | 400/124 |
| 4,589,786 | 8/1986 | Fukui et al. | 400/124 |
| 4,622,484 | 11/1986 | Okihara | 310/328 |
| 4,633,118 | 12/1986 | Kosugi | 310/328 |
| 4,644,213 | 2/1987 | Shibuya | 310/328 |
| 4,647,808 | 3/1987 | Shibuya | 310/328 |
| 4,706,230 | 11/1987 | Inoue | 310/328 X |
| 4,783,610 | 11/1988 | Asano | 400/124 X |

FOREIGN PATENT DOCUMENTS

| 65784 | 12/1982 | European Pat. Off. | 400/124 |
| 163669 | 9/1983 | Japan | 400/124 |
| 16767 | 1/1984 | Japan | 400/124 |
| 59-137041 | 9/1984 | Japan | 400/124 |
| 26273 | 10/1984 | Japan | 400/124 |
| 59-229349 | 12/1984 | Japan | 400/124 |
| 60-000969 | 1/1985 | Japan | 400/124 |
| 31266 | 2/1985 | Japan | 400/124 |
| 31975 | 2/1985 | Japan | 400/124 |
| 60-031976 | 2/1985 | Japan | 400/124 |
| 115460 | 6/1985 | Japan | 400/124 |
| 62-028537 | 2/1987 | Japan | 400/124 |
| 56155 | 3/1987 | Japan | 400/124 |
| 62-087839 | 6/1987 | Japan | 400/124 |
| 62-087840 | 6/1987 | Japan | 400/124 |
| 62-090141 | 6/1987 | Japan | 400/124 |
| 138254 | 6/1987 | Japan | 400/124 |
| 292445 | 12/1987 | Japan | 400/124 |
| 535114 | 12/1976 | U.S.S.R. | 310/328 |

*Primary Examiner*—David A. Wiecking
*Assistant Examiner*—Joseph R. Keating
*Attorney, Agent, or Firm*—Jones, Tullar & Cooper

[57] ABSTRACT

A very small displacement enlargement mechanism is disclosed, in which a first stationary frame and a second movable frame are disposed on the opposite sides of a piezoelectric element for producing a strain in a longitudinal direction according to an applied voltage. A movable member consisting of a plurality of elements linked together into a substantially parallelogrammic form is disposed between the two frames such as to surround the piezoelectric element. An element of the movable member or the side of the first frame is united integrally to the first frame, and another element which is on the side of the second frame and faces the first-mentioned element is united integrally to the second frame. The strain of the piezoelectric element produces a relative displacement of the two frames via the movable member, and the relative displacement is transmitted as an enlarged output to a drive wire. A printing head has a plurality of radially spaced-apart mounting grooves, and a printing unit having the above construction is mounted in each of the mounting grooves.

14 Claims, 11 Drawing Sheets (a)  (b)

(a) (b)

VERY SMALL DISPLACEMENT ENLARGEMENT MECHANISM AND PRINTING HEAD USING THE SAME

BACKGROUND OF THE INVENTION

This invention relates to a very small displacement enlargement mechanism using a piezoelectric element having a piezoelectric effect and a printing head using such a mechanism.

A usual dot type printer has a printing head, which uses a very small displacement enlargement mechanism for transmitting a dimensional strain generated by a piezoelectric effect of a piezoelectric element after enlargement to a drive section to obtain a drive force to drive a printing wire.

FIG. 29 shows such a very small displacement enlargement mechanism in the prior art. In the Figure, reference numeral 1 designates a piezoelectric element for generating a dimensional strain with a piezoelectric effect. The piezoelectric element 1 has a lower stationary section and an upper drive section. The stationary section is secured to a mounting section 3 of a stationary frame 2 made of a metal, and the drive section is secured to a mounting section 4 of the frame 2. The mounting section 4 has two movable coupling sections (a) and (b), via which stems of respective movable members 5 and 6 are coupled to the section 4. The stems of the movable members 5 and 6 are also coupled via movable coupling sections (c) and (d) to the opposite ends of the stationary frame 2. When a dimensional strain is produced in the piezoelectric element 1, the movable members 5 and 6 are rotated about the respective movable coupling sections (c) and (d) and displaced in opposite directions. A bar-like spring member 7 has one end secured to a free end of the movable member 5. A substantially V-shaped spring member 8 has one end secured to a free end of the movable member 6. The other ends of the spring members 7 and 8 are coupled together at a coupling section (g), to which an end of an outwardly extending printing wire 9 is secured. Very small displacement enlargement mechanisms having similar constructions and printing heads of impact type using printing units consisting of such mechanisms are disclosed in U.S. patent specification No. 4,589,786 and Japanese patent disclosures Nos. 59-229349, 59-26273, 60-969, 60-31975 and 60-31976.

With the very small displacement enlargement mechanism having the above construction shown in FIG. 29, a very small dimensional strain is produced in the piezoelectric element 1 in a direction of arrow (A) according to a voltage applied between electrodes of the element 1. This dimensional strain causes rotation of the movable members 5 and 6 about the movable coupling sections (c) and (d) as fulcrum points and also about the coupling sections (a) and (b) as force points in the directions of arrows (B) and (C), so that it is transmitted after enlargement. When the movable members 5 and 6 are displaced, the spring members 7 and 8 receive the respective displacements and are displaced in opposite directions as shown by arrows (D) and (E). Thus, a couple acts on the coupling section (g) in a direction of arrow (F), so that the printing wire 9 secured to the coupling section (g) is driven in a direction of arrow (G).

As is shown, in the prior art very small displacement enlargement mechanism, the dimensional strain of the piezoelectric element 1 is enlarged by the movable members 5 and 6 and spring members 7 and 8 to obtain an enlargement ratio (of several ten times) which is necessary for driving the printing wire 9.

With such a prior art structure, the drive section (x), enlarging section (y) and wire section (z) are arranged substantially on a straight line as shown in FIG. 29, and also the printing wire 9 is driven outwardly. Therefore, the mechanism is inevitably large in size, and a printing wire having a plurality of (for instance, 24) wires, constructed using this mechanism, is considerably large in size and heavy in weight. This is greatly undesired from the standpoint of reducing the size and weight of the apparatus. Such a printing head is heavy in weight and poses problems in the control of its driving.

Further, in order to arrange the wires of the printing head at a predetermined interval, it is necessary to collectively guide the ends of the wires toward a wire-arranging member to let the wire ends be held in an accurate positional relation to one another by 24 holes. Therefore, in a prior art printing head, for instance as shown in Japanese Patent Disclosure No. 59-229349, 12 printing units each including a very small displacement enlargement mechanism and a printing wire are stacked in a sector-like fashion on each side. In this case, it is necessary to stack the very small displacement enlargement mechanisms and spacers alternately and secure the resultant stack by means of a curved screw. For this reason, the assembling of the prior art printing head requires a large number of components and also a large number of assembling steps. Further, it is difficult to obtain a high accuracy assembly.

With the very small displacement enlargement mechanism, when assembling the piezoelectric element, the accuracies of the dimension of the element in the direction of generation of strain and the dimension between the mounting sections, to which the element is secured are important. In order to transmit a displacement of the piezoelectric element which is of the order of several microns to several ten microns at most, there should be no gap between the element and each mounting section in a state, in which the two are assembled together with a very high accuracy. Rather, unless the piezoelectric element is held such that it is slightly compressed, the efficiency of transmission of a displacement of the piezoelectric element to an enlarging mechanism is deteriorated.

However, it is difficult in fact to mount the piezoelectric element in the state noted above by controlling the two dimensional accuracies noted above. If it is possible, the price of the product will be extremely increased. Further, it is very difficult to assemble the two in the above dimensional relation to each other. Usually, the piezoelectric element is loosely inserted into the space between the mounting sections of the very small displacement enlargement mechanism and subsequently the state of mounting of the element is adjusted to hold the element to be compressedly secured.

Prior art techniques for adjusting the state of mounting of the piezoelectric element besides those disclosed in the prior art documents noted above include one, in which one end of the piezoelectric element is secured via a wedge-like spacer member so a securing member (as disclosed in Japanese Utility Model Disclosure No. 59-137041), one, in which the piezoelectric element is secured by providing a mechanical trace in a securing section (as disclosed in Japanese Utility Model Disclosure No. 62-28537), one, in which the piezoelectric element is secured by using a depression formed in a connecting member provided on a base by using a punch or the like (as disclosed in Japanese Utility Model Disclosure No. 62-87839), one, in which the piezoelectric element is secured by forming a base with a hole and raising the base with an oval sectional profile pin inserted in the hole (as disclosed in Japanese Utility Model Disclosure No. 62-87840), and one, in which the piezoelectric element is secured by forming a base with a hole and raising the base with a tapered pin pressure-fitted in the hole (as disclosed in Japanese Utility Model Disclosure No. 62-90141).

In the prior art techniques, however, the piezoelectric element is inserted into the space between mounting sections of the enlarging mechanism, and the state of mounting of the element is adjusted by using a wedge-like spacer member, a mechanical trace, a depression, an oval pin or a tapered pin. This means that a special adjusting operation should be done when mounting the piezoelectric element, so that the assembling operation is not so easy.

SUMMARY OF THE INVENTION

The present invention has been developed in the light of the above problems, and one of its objects is to provide a very small displacement enlargement mechanism, which permits reduction in size and reduction of the size and cost of a printer or like apparatus.

Another object of the invention is to provide a printing head, which permits reduction of the size and weight, permits ready printing wire drive control, does not require any accessory component for assembling, can be assembled in a reduced number of steps and has an improved accuracy of assembling.

To attain the above objects of the invention, there is provided a very small displacement enlargement mechanism, which comprises a piezoelectric element operable to generate a dimensional strain according to an applied voltage, a first frame and a second frame, these frames being substantially arranged on the opposite sides of and to extend in the direction of operation of the piezoelectric element, a movable member including a plurality of elements linked together into a polygonal form, having a pair of mounting sections, to which the piezoelectric element is compressedly secured, the movable member further having at least a portion of it, which is on the side of the first frame, integral with the first frame and having at least a portion of it, which is on the side of the piezoelectric element opposite the first-mentioned side and faces the first-mentioned side, integral with the second frame, an output section for providing the dimensional strain of the piezoelectric element enlargedly transmitted via the movable member to at least either one of the first and second frames after enlargement according to a relative displacement of the first and second frames to each other, and a drive section coupled to the output section for receiving the enlarged dimensional strain output.

According to the invention, there is also provided a very small displacement enlargement mechanism, which comprises a piezoelectric element operable to generate a dimensional strain according to an applied voltage, a stationary frame, to which one end of the piezoelectric element is secured, a first frame and a second frame, the first and second frames being coupled to the stationary frame or the opposite sides of the secured end of the piezoelectric element, a movable member having two sides movably coupled together, the other end of the piezoelectric element being secured to the movable member, the movable member having one end being coupled via a movable coupling section to the second frame on the stationary frame side of the other end of the piezoelectric element and the other end coupled via a movable coupling section to the first frame, an output section for providing the dimensional strain of the piezoelectric element enlargedly transmitted via the movable member to at least one of the first and second frames after enlargement according to a relative displacement of the first and second frames to each other, and a drive member coupled to the output section for providing an enlarged output.

According to the invention, there is further provided a very small displacement enlargement mechanism, comprising a piezoelectric element operable to generate a displacement according to an applied voltage, a stationary frame, a first frame and a second frame, the first and second frames being coupled to the stationary frame, a movable member including a plurality of elements linked together into a form of a closed loop and having mounting sections, to which the piezoelectric element is compressedly secured, a pair of link points of the movable member facing each other laterally with respect to the direction of operation of the piezoelectric element being coupled via respective movable coupling sections to the first and second frames, respectively, an output section for providing the dimensional strain of the piezoelectric element enlargedly transmitted via the movable member to at least either one of the first and second frames according to a relative displacement of the first and second frames to each other, and a drive member coupled to the output section for receiving an enlarged dimensional strain output.

According to the invention, there is still further provided a very small displacement enlargement mechanism, which comprises a piezoelectric element operable to generate a dimensional strain according to an applied voltage, a stationary frame, a movable member including a plurality of elements linked together into polygonal form and having a pair of mounting sections provided at opposed apices, the piezoelectric element being compressedly secured to the mounting sections, one of the mounting sections being united integrally to the stationary frame, a first frame and a second frame, the first and second frames being united integrally to respective two sides of the movable member on the side of the stationary frame, an output section for providing the dimensional strain of the piezoelectric element enlargedly transmitted via the movable member to each of the first and second frames after enlargement according to a relative displacement of the first and second frames to each other.

According to the invention, there is yet further provided a very small displacement enlargement mechanism, wherein the drive section is a printing wire disposed substantially parallel to the piezoelectric element.

According to the invention, there is further provided a very small displacement enlargement mechanism, which comprises a piezoelectric element for generating a dimensional strain according to an applied voltage and an enlarging member including a plurality of elements linked together into a form of a closed loop and having a pair of mounting sections, to which corresponding opposite ends of the piezoelectric element are compressedly secured, and a pair of output sections provided on the opposite sides of the piezoelectric element.

According to the invention, there is further provided a very small displacement enlargement mechanism, which comprises a piezoelectric element for generating the dimensional strain according to an applied voltage, a pair of mounting sections, to which corresponding ends of the piezoelectric element are compressedly secured, and a pair of output sections provided on the opposite sides of the piezoelectric element, the pair of mounting sections being linked to the corresponding output sections.

With the above construction of the very small displacement enlargement mechanism according to the invention, a dimensional strain produced in the piezoelectric element according to an applied voltage is provided after enlargement by the movable member or enlarging member in a different direction, i.e., in a transversal direction with respect to a piezoelectric element. This enlarged output causes rotation or rocking movement of the first or second frame. As a result, the enlarged output is provided after further enlargement by relative displacements of output ends of these frames, the enlarged output being transmitted to a drive member.

According to the invention, it is possible to accommodate the drive section consisting of a piezoelectric element, an enlarging section and a wire section can be accommodated substantially in the same area to permit reduction of the mechanism as a whole, permit reduction of the size, weight and price of apparatus such as printers and increase the scope of application and facilitate the mounting of the piezoelectric element.

Further, the very small displacement enlargement mechanism according to the invention permits a compact printing head to be obtained by constructing a drive section with a printing wire and disposing the printing wire in parallel with the piezoelectric element.

With the very small displacement enlargement mechanism according to the invention, if the distance between a pair of coupling sections in the output section is made smaller than the distance between a pair of mounting sections, the dimensional strain of the piezoelectric element transmitted to the mounting sections is provided after enlargement in the direction of approach to the piezoelectric element.

When mounting a piezoelectric element in the very small displacement enlargement mechanism according to the invention, the enlarging member can be readily deformed and restored. Thus, the distance between the mounting sections can be increased by applying an external force to the output section. Also, the piezoelectric element can be secured in a compressed state between the mounting sections by removing the external force.

Thus, according to the invention enlargement of displacement can be obtained with a very simple construction, and also the enlarging member can be readily deformed and restored because of its high elasticity. For this reason, when mounting the piezoelectric element, an operation of adjustment for securing the element in a compressed state can be done at the same time, and the mechanism can be very readily assembled.

Further, a printing head according to the invention comprises a printing-unit mounting member basically having a hollow cylindrical shape with a bottom having a plurality of radially spaced-apart mounting grooves formed on the inner peripheral surface and a wire-arranging member provided at the bottom, and a plurality of printing units each including a displacement transmission section for transmitting after enlargement a dimensional strain of a piezoelectric element generating a dimensional strain according to an applied voltage, a mounting section, to which the displacement transmission section is coupled, and a printing wire coupled to an output section of the displacement transmission section and extending parallel to the mounting section, the mounting section being fitted in a corresponding one of the mounting grooves.

Another printing head according to the invention comprises a printing-unit mounting member having a bottom surface formed with a plurality of radially spaced-apart mounting grooves and a central portion of the bottom provided with a wire-arranging member, and a plurality of printing units each including a mounting member, a piezoelectric element mounted on the mounting section and extending in a direction substantially perpendicular thereto, a displacement transmission section for enlargedly transmitting the dimensional strain of the piezoelectric element and a printing wire extending substantially parallel to the displacement transmission section, the mounting section being fitted in a corresponding one of the mounting grooves.

In a preferred form of printing head according to the invention, each printing unit is secured with a securing member fitted in each of a plurality of radially spaced-apart mounting grooves formed in the printing-unit mounting member and with a projection fitted in a groove formed on the upper end surface of the printing-unit mounting member Since with the printing head according to the invention the securing members of the very small displacement enlargement members are fitted in the respective mounting members formed in the printing-unit mounting member with a bottom, the number of components is greatly reduced compared to the prior art. In addition, the number of assembling steps is greatly reduced to improve the accuracy of assembling. Further, since the printing-unit mounting member has a bottom and the very small displacement enlargement mechanisms are arranged radially, the printing head can be simplified in the outer shape, its size and weight can be greatly reduced compared to the prior art structure, and its driving can be readily controlled.

The above and other aspects and advantages of the present invention will become completely disclosed below with references of the accompanying drawings.

DETAILED DESCRIPTION OF THE PREFERRED EMBODIMENTS

Now, preferred embodiments of the invention will be described in detail with reference to the drawings.

(First Embodiment)

Figure 1:
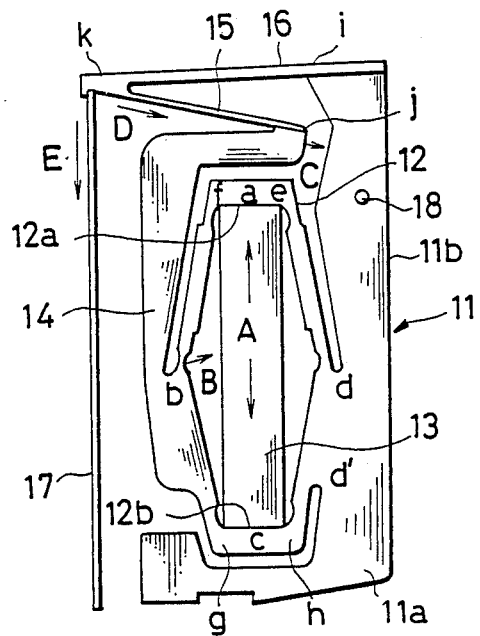
FIG. 1 is a side view showing a first embodiment of the very small displacement enlargement mechanism according to the invention.

FIG. 1 shows a first embodiment of the very small displacement enlargement mechanism according to the invention. Referring to the Figure, reference numeral 11 designates a stationary frame as first frame made from a metal member, for instance a steel member for a spring, having a large elastic modulus. The stationary frame 11 has a substantially L-shaped form, having a horizontal portion 11a and a vertical portion 11b. Reference numeral 12 designates a first movable member having a polygonal shape, for instance, a substantially parallelogrammic shape, having sides bf, fe, ed, dh, hg and gb. The sides fe and hg of the first movable member 12 constitute a pair of piezoelectric element mounting sections 12a and 12b having a fixed width, so that the first movable member has a hexagonal shape in direct view. The length of these sides fe and hg is determined according to the width of a piezoelectric element 13. In operational principles, the sides fe and hg act as linking ends (a) and (c), and in a view of operational principles to be described later in this embodiment the first movable member 12 will be explained as a parallelogrammic link mechanism with apices (a) to (d). This is the same in the following second to fifth embodiments. The first movable member 12 has piezoelectric element mounting sections 12a and 12b having parallel surfaces provided at opposed apices (a) and (c). The piezoelectric element 13, which can produce a dimensional strain with a piezoelectric effect, is secured in a compressed state between the mounting sections 12a and 12b. The ends (e,f) and (g,h) of the mounting sections 12a and 12b are notched to such an extent that they serve as movable coupling sections or hinges.

The side hd of the first movable member 12 on the side of the horizontal portion 11a and also on the side of the vertical portion 11b is integral with a lower portion of the vertical portion 11b. It is adapted to be deformed about its side hd as a fulcrum according to a dimensional strain produced in the piezoelectric element 13, thus producing a first displacement of turning toward the stationary frame 11. The length (d-d') of a coupling section between the side hd and vertical portion 11d is set such that it will not obstruct the hinge function of the movable coupling sections (d) and (h), for instance substantially two-thirds of the upper portion. A substantially V-shaped second movable member 14 as second frame has its stem made integral with the side bg of the first movable member 12 facing the side hd on the opposite side of the piezoelectric element 13. The second movable member 14 has a free end portion extending to surpass the first movable member 12 upwardly. It can be turned about the end (g) as a fulcrum toward the vertical portion 11b of the stationary frame 11 with a horizontal displacement of the apex (b) of the first movable member 12, i.e., an angular displacement of the side bg, and a second displacement for enlargement is produced at its free end. To the free end of the second movable member 14 one end of a leaf spring member 15 is coupled by soldering via a coupling section (j). Another leaf spring member 16 has one end which is solderedly coupled by soldering to the free end of the stationary frame 11 via a coupling section (j). The other ends of the leaf spring members 15 and 16 are coupled together at a coupling section (k) to constitute an output section. A printing wire 17 having an end serving as a drive member is secured to the coupling section (k) and extends parallel to the piezoelectric element 13. Of the stationary frame 11 the horizontal portion 11a has its free end corresponding in position to the lower end of the second movable member 14, and the vertical portion 11b has the free end corresponding in position to the upper end of the second movable member 14. The stationary frame 11 surrounds and protects one vertical side and lower end of an enlarging section consisting of the first and second movable members 12 and 14. The vertical portion 11b of the stationary frame 11 has a projection corresponding to a groove 22 in a printing-unit mounting member 20. The first and second movable members 12 and 14 are made together with the stationary frame 11 from a metal sheet. The leaf spring members 15 and 16 may also be made integral with the first and second movable members 12 and 14.

Figure 2:
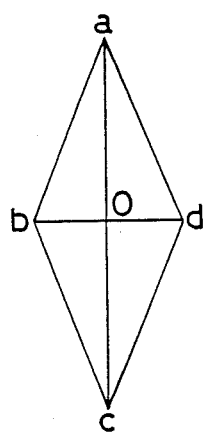
FIGS. 2 to 4 are views for explaining the principles of enlarging operation of the mechanism shown in FIG. 1.
Figure 3:
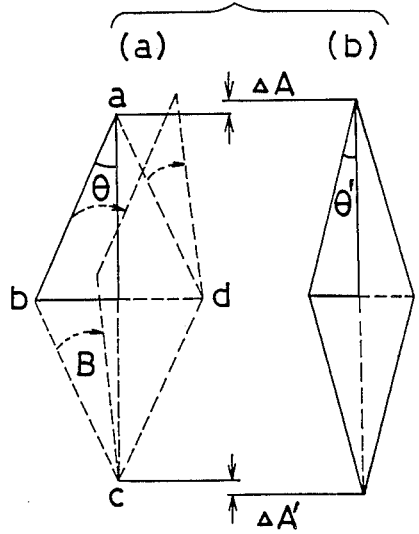
Figure 4:
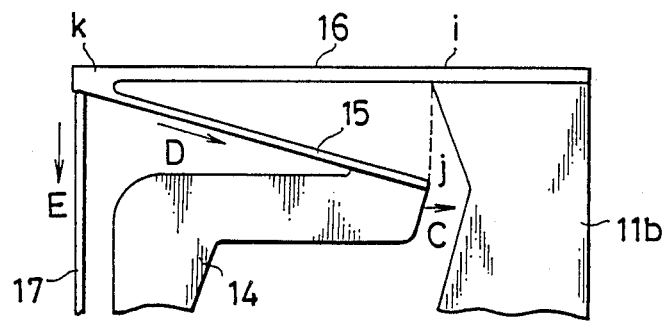

The operation of the very small displacement enlargement mechanism having the above construction will now be described with reference to FIGS. 2 to 4. FIG. 2 schematically shows the first movable member 12. This parallelogrammic member has its apices (a) to (d) formed with respective notches so that these apices serve the role of a hinge. The length of each of the sides ab, bc, cd and de is fixed at all time, and the piezoelectric element 13 is mounted such that it extends along the long diagonal ac, so that a change in the length of the diagonal ac appears as a change in the length of the diagonal bd. Further, since the triangles $\triangle abc$ and $\triangle adc$ are symmetrical with respect to the diagonal ac, a change in the length b0 with a change in the length of the diagonal ac is one half the change in the length of the diagonal bd. Further, a change in the length a0 when the triangle △ab0 is considered is one half the change in the length of the diagonal ac.

On the basis of the above description, the enlarging function of the first movable member 12 will now be described with respect to one of the four triangles of the parallelogram, i.e., the triangle αab0. In FIG. 3(a), the solid line shows the state of the parallelogram without any change in the length of the long diagonal ac, i.e., when there is no applied voltage to the piezoelectric element 13. When a voltage is applied to the piezoelectric element 13, a dimensional strain is produced in the direction of arrow (A) in FIG. 1, so that the diagonal ac is slightly elongated by αA and αA' as shown by the solid lines in FIG. 3(b). The displacement of the entirety of the element 13 produced at this time is αA+αA'. The left and right sides ab and bc are equal in length as noted above. Practically, the angle ∠ba0 is 10 to 20 degrees, and the enlargement ratio was calculated in cases when the angle θ is 10 and 20 degrees, respectively. Assuming the length of the side ab to be 10 mm and the elongation ΔA of the side a0 to be 0.01 mm, i.e., the overall displacement of the piezoelectric element 13 to be 0.02 mm, when θ=20°, the elongation of the diagonal bd was 0.054 mm corresponding to an enlargement ratio of 2.7. When θ=10°, the enlargement ratio was 5.7.

Referring back to FIG. 1, while the enlarging function of the first movable member 12 is as described above, the parallelogrammic mechanism noted above has its side hd integral with the vertical portion 11b of the stationary frame 11. Therefore, the dimensional strain of the piezoelectric element 13 in the direction of arrow (A) enlarged by the parallelogrammic mechanism is generated collectively in the sides fb, bg and de of the first movable member 12 such as to produce a turning toward the stationary frame 11, i.e., toward a direction of arrow (B). At this time, although the second movable member 14 is deformed as shown by solid line in FIG. 3(b), since its side cd is integral with the vertical portion 11b, it undergoes an angular displacement about the point (c) as a fulcrum toward the vertical portion 11b as shown by broken line in FIG. 3(a), thus producing an enlarged displacement in the coupling section (j) at the free end. The enlargement ratio in this case is jg/bg. The enlarged displacement produced at the free end of the second movable member 14 is further enlarged by the spring member 15 before it is transmitted to the printing wire 17. This enlarging function will now be described with reference to FIG. 4. Then an enlarged displacement is produced in the direction of arrow (C) at the free end of the second movable member 14, the spring member 15 coupled thereto is moved in the direction of arrow (D). The other end of the spring member 15 is coupled to an end of the other spring member 16 in the coupling section (k), and the other end of the spring member 16 is coupled to the free end (i) of the vertical portion 11b of the stationary frame 11. The coupling sections (k), (j) and (i) of the spring members 15 and 16 form a triangle. Thus, when a force is exerted on the spring member 15, the triangle is moved with the coupling section (i) as a fulcrum in the direction of arrow (D), that is, there is a component of displacement in the direction of arrow (E) with respect to the coupling section (k). The enlargement ratio in the case of this displacement is ik/ij. The displacement which is generated in the coupling section (k) in this way reaches several ten times the dimensional strain of the piezoelectric element 13 as a source of displacement. This displacement is transmitted as such to the printing wire 17 secured to the coupling section (k).

As is shown, in this embodiment of the very small displacement enlargement mechanism having the above enlarging function, the stationary frame 11 and first and second movable members 12 and 14 are formed integrally from a single metal sheet, the piezoelectric element 13, stationary frame 11, first and second movable members 12 and 14 and printing wire 17 are disposed parallel, the printing wire 17 is driven inwardly, and the second movable member 14 is driven toward the piezoelectric element 13. Therefore, the drive section, enlarging section and printing wire section are accommodated substantially in the same area. Thus, this embodiment of the very small displacement enlargement mechanism is extremely reduced in size compared to the prior art with the same size of the piezoelectric element 13 i.e., dimension thereof in the longitudinal direction in this embodiment, and the same enlargement ratio. This means that when a printing head having a plurality of, for instance 24, printing wires is constructed, not only wide reduction of the size, weight and further price is attainable, but also the printing head can find novel applications because of its small size and light weight.

As a further effect of this embodiment of the very small displacement enlargement mechanism, it is possible to improve the readiness of mounting of the piezoelectric element 13 in the enlarging mechanism. The piezoelectric element 13 is usually fabricated with a longitudinal dimensional accuracy of 1/100 mm, that is, comparatively high dimensional accuracy is provided. However, there are of course dimensional fluctuations. Further, in the enlarging mechanism it is necessary to provide high dimensional accuracy of the portion in which the piezoelectric element 13 is mounted. However, fluctuations are again inevitable. Further, the piezoelectric element 13 of lamination type usually is weak to tensile force although it is strong to compressive force. Therefore, it is necessary to pay considerations that the piezoelectric element assembled in the enlarging mechanism experiences a certain extent of compressive force in a normal state without any applied voltage. Of course the range of the enlargement displacement of the enlarging mechanism produced with the displacement of the piezoelectric element 13 is covered within the limit of elasticity of the overall mechanism, and the displaced mechanism is restored to the initial state by the combination of the elastic restoring force of itself and shrinking force of the piezoelectric element 13. However, where the piezoelectric element 13 is normally held in a compressed state, it will not experience substantial tensile force, which is very effective in the aspect of protection of the piezoelectric element 13. In this respect, in this mechanism the dimension between the piezoelectric mounting sections 12a and 12b of the first movable member 12 is set to be slightly smaller than the corresponding dimension of the piezoeletric element 13. When mounting the piezoelectric element 13, inwardly acting external forces are applied to the apices (d) and (b) along the short diagonal bd to increase the distance between the mounting sections 12a and 12b to be greater than the length of the piezoelectric element 13. Thus, the piezoelectric element 13 can be readily mounted, while providing compressive force to the piezoelectric element 13 by the elasticity of the mechanism after the mounting of the element 13. In this way, the mechanism can be mounted readily compared to the prior art mechanism.

Further, in the above very small displacement enlargement mechanism the first movable member 12 has a parallelogrammic shape symmetrical with respect to the center line of the piezoelectric element 13. Thus, the displacement of the piezoelectric element 13 in the longitudinal direction is evenly transmitted to the left and right to produce a bending stress in the element 13. Further, the mechanism has a comparatively small number of hinges, so that it is possible to reduce wasteful energy consumption. Further, since the stationary frame surrounds one side and lower end of the movable section constituted by the first and second movable members 12 and 14, it is possible to protect the movable section and readily mount the mechanism in a printing-unit mounting mechanism 20 to be described later. Further, the parallelogrammic shape of the link mechanism consisting of the first movable member 12 is not limited to a geometrically stringent parallelogrammic shape, but it may be modified to some extent. Further, it is possible to adopt a link mechanism having any other polygonal shape such as a hexagonal shape. In general, any shape may be adopted so long as a dimensional strain of the piezoelectric element 13 can be generated in a transversal direction of the piezoelectric element 13.

The above embodiment of the very small displacement enlargement mechanism is applicable to dot-type printing heads, relays, positioning mechanisms, loudspeakers and various other mechanisms and devices.

Figure 5:
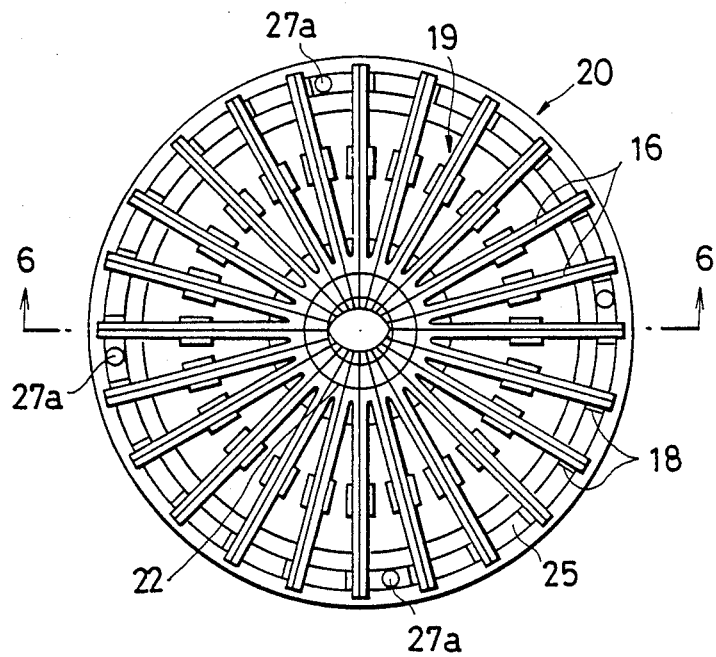
FIG. 5 is a plan view showing a printing head using the mechanism shown in FIG. 1.
Figure 6:
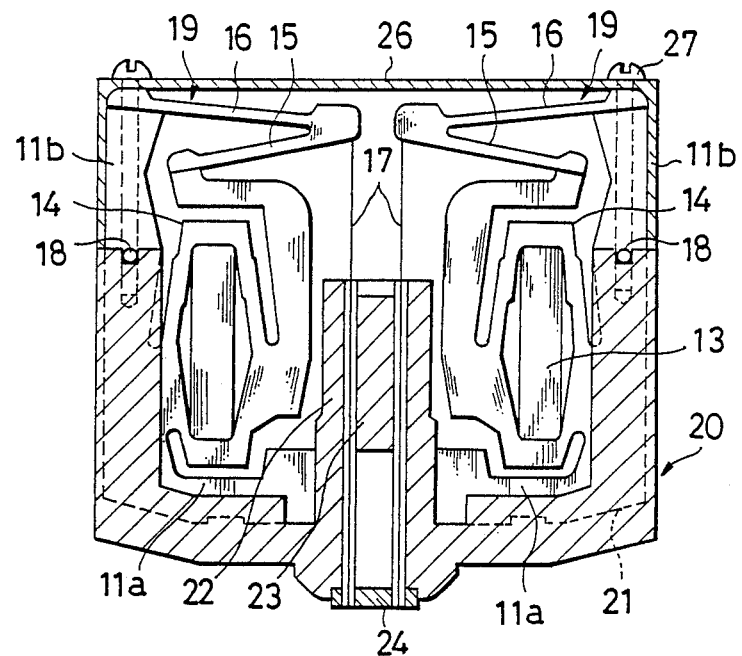
FIG. 6 is a sectional view taken along line 6—6 in FIG. 5.
Figure 7:
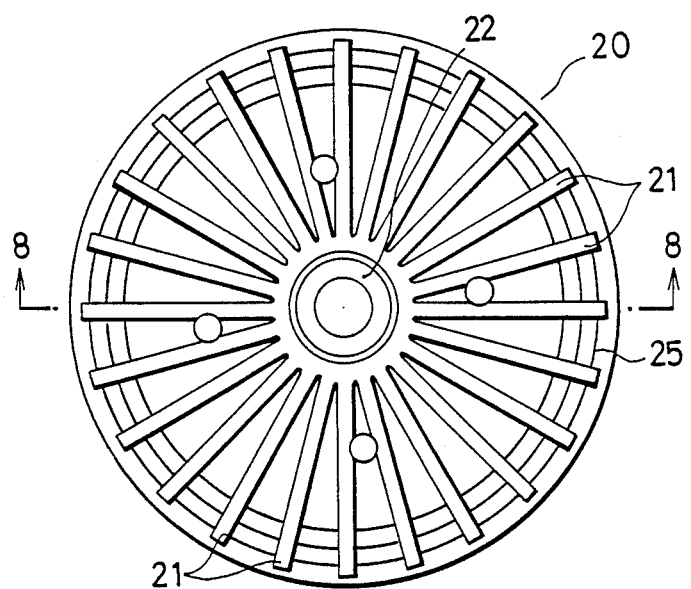
FIG. 7 is a plan view showing a printing-unit mounting member.
Figure 8:
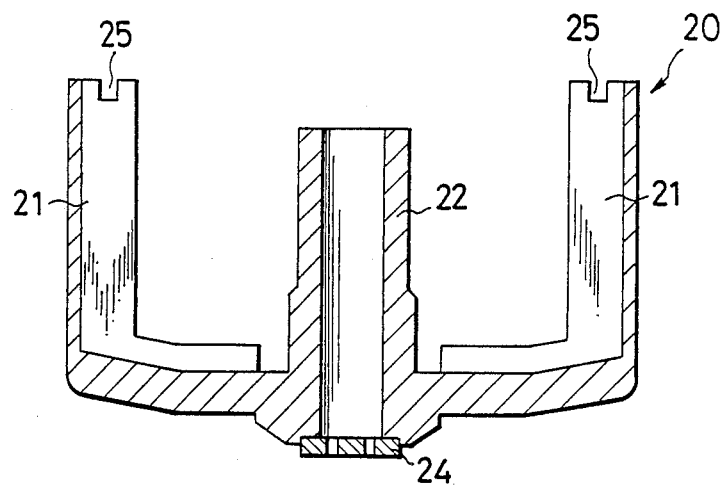
FIG. 8 is a sectional view taken along line 8—8 in FIG. 7.
Figure 9:
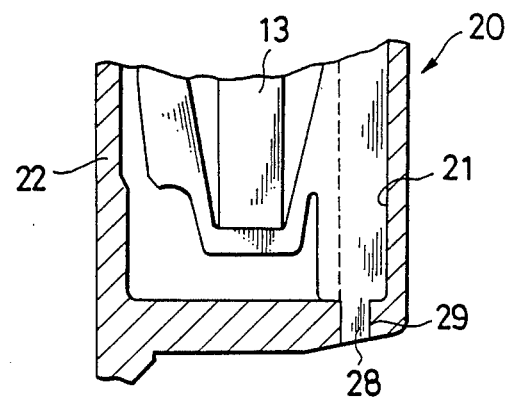
FIG. 9 is a fragmentary sectional view showing a modified printing head.

FIG. 5 is a plan view showing a printing head using a plurality of very small displacement enlargement mechanisms noted above, FIG. 6 is a sectional view taken along line 6—6 in FIG. 5; FIG. 7 is a plan view showing a printing-unit mounting member; and FIG. 8 is a sectional view taken along line 8—8 in FIG. 1. In these Figures, reference numeral 20 designates the printing-unit mounting member noted above, which has a hollow cylindrical shape with a bottom. In the printing-unit mounting member 20, a plurality of, for instance 24, very small displacement enlargement mechanisms 19 are arranged radially. More specifically, the printing-unit mounting member 20 has its inner peripheral and bottom surfaces formed with 24 radially spaced-apart mounting grooves 21 each in correspondence to the positions of mounting of the horizontal and vertical portions 11a and 11b of each of the very small displacement enlargement mechanisms 19. The horizontal and vertical portions 11a and 11b of each very small displacement enlargement mechanism 19 are fitted in each of these mounting grooves 21. The printing-unit mounting member 20 has a cylindrical guide 22 projecting inwardly from the center of the bottom. The cylindrical guide 22 is hollow, and in which an auxiliary guide member 23 for guiding substantially central portions of printing wires 17 secured to the very small displacement enlargement mechanisms and a wire arrangement member 24 for arranging end portions of the printing wires 17 in two rows are provided. The upper end surface of the printing-unit mounting member 20 is formed with engagement grooves 25, in which projections 18 of the respective very small displacement enlargement mechanisms 19 are fitted.

More specifically, in the printing head, the individual very small displacement enlargement mechanisms 19 are in the printing-unit mounting member 20 arranged with the horizontal and vertical portions 11a and 11b of the stationary frame 11 of each of them fitted in each of the radially spaced-apart mounting grooves 21, the projection 18 of each fitted in each engagement groove 25 formed in the upper end surface of the member 20 and each printing wire 17 guided by an auxiliary guide member 23 provided in the guide 22 and inserted through a corresponding predetermined hole of the wire arrangement member 24.

With this printing head, unlike the prior art structure, no spacer is required, so that the number of components can be greatly reduced. In addition, for the assembly it is only necessary to fit the stationary frames 11 of the very small displacement enlargement mechanisms 2 in the mounting grooves 21 of the printing-unit mounting member 20 and fit the projections in the engagement grooves 25. Thus, no cumbersome work such as tightening of screws is necessary, and accuracy of assembling is improved. Further, the grooves 21 are integral with the stationary frame 11 to reinforce the mechanical strength of the frame 11. Further, all the very small displacement enlargement mechanisms 19 can be urgedly secured to the printing-unit mounting member 20 from above at a time by fitting a cap member 26 to the top of the printing-unit mounting member 20 with set screws 27 or the like such that the inner surface of the cap member 26 is in contact with the upper end surface of the vertical portion 11b of each very small displacement enlargement mechanism 19 as shown in FIG. 6. In FIG. 5, designated at 27a are threaded holes provided for the set screws 27. Further, in the printing head, the shape of the very small displacement enlargement mechanisms 19 and shape of the printing-unit mounting member 20 may be selected such that the head has a substantially cylindrical shape. Further, the head is simple in outer shape and is greatly reduced in size and weight compared to the prior art. Thus, the drive control can be facilitated, and it can find applications which could not be hitherto conceivable.

Figure 10:
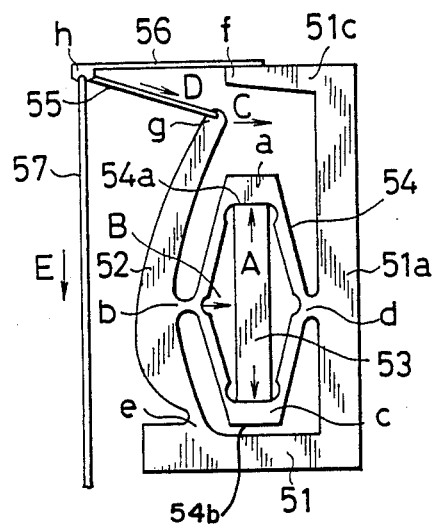
FIG. 10 is a side view showing a second embodiment of the very small displacement enlargement mechanism according to the invention.

In the structure shown in FIG. 6, the mounting holes 21 for mounting the very small displacement enlargement structures 19 in the printing-unit mounting member 20 are formed in the inner bottom and peripheral surfaces of the member 20 in correspondence to the horizontal and vertical portions 11a and 11b of the very small displacement enlargement mechanisms 19. However, it is possible to form mounting grooves only in the inner peripheral surface to receive only the vertical portions 11b of the very small displacement enlargement mechanisms 19. Further, the lower end of the vertical portion 11b may be provided with a projection 28, and the bottom of the printing-unit mounting member 20 may be provided with a corresponding hole 29 for inserting the projection 28 therein. Further, the periphery of the guide 22 may be provided with mounting grooves, and the free end of the horizontal portion 11a of each very small displacement enlargement mechanism 19 may be fitted in each of these mounting grooves. Further, the very small displacement enlargement mechanism 19 is by no means limitative; for instance, it is possible to use a very small displacement enlargement mechanism as shown in FIG. 10 having a different enlarging function. In general, the mechanism may be used so long as its vertical portion has a mounting section. In the printing head, the cylindrical shape of the printing-unit mounting member is by no means limitative, and it is possible to adopt a slightly modified shape, for instance a shape having an oval sectional profile, or having an angular sectional profile.

(Second Embodiment)

FIG. 10 shows a second embodiment of the very small displacement enlargement mechanism according to the invention. Referring to the Figure, reference numeral 51 designates a stationary frame made from a metal sheet. A first movable member 54 is disposed above the stationary frame 51. The first movable member 54 has a polygonal shape, for instance a parallelogrammic shape. Piezoelectric element mounting sections 54a and 54b having respective parallel surfaces are provided at apices on a long diagonal. A piezoelectric element 53 is compressedly secured between these mounting sections 54a and 54b. A stationary frame 51a as first frame and a movable frame 52 as second frame are coupled to the stationary frame 51 on the opposite sides of the first movable member 54 such that they extend parallel to the piezoelectric element 53. The movable frame 52 has a substantially V-shaped form and is coupled via a movable coupling section (e) to the stationary frame 51. Meanwhile, the stationary frame 51a is integral with the stationary frame 51 in an L-shaped form.

One of the apices of the first movable member 54 on the other diagonal is secured via a movable coupling section (d) to the stationary frame 51a. The other apices is coupled via a movable coupling section (b) to the movable frame 52 at a position thereof symmetrical with the coupling section (d). The first movable member 54 is symmetrical with respect to the piezoelectric element 53. Thus, when a dimensional strain is produced in the piezoelectric element 53, strain is produced substantially laterally evenly in the movable member 54. This means that no inpartial stress is produced in the piezoelectric element 53. This has an effect of preventing the generation of a bending stress in the piezoelectric element 53, thus preventing rupture of the element 53 and permitting effective consumption of energy generated in the element 53.

The movable frame 52 is rotatable about the movable coupling section (e) as a fulcrum with deformation of the first movable member 53 in the horizontal direction caused by generation of stress. A leaf spring member 55 is coupled by soldering to the free end of the movable frame 52 via the coupling section (g).

The stationary frame 51a has a horizontal upper end portion 51c, to which one end of another leaf spring member 56 is coupled by soldering via a coupling section (f). The other ends of the spring members 55 and 56 are coupled together in a coupling section (h), and the stem of a downardly extending printing wire 57 is secured to the coupling section (h). The movable frame 52 and first movable member 54 are formed together with the stationary frames 51, 51a from a metal sheet. The spring members 55 and 56 may be integral with the stationary frames 51, 51a and movable frame 52, respectively.

Figure 11:
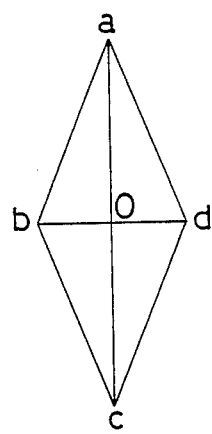
FIGS. 11 to 13 are views showing the principles of enlarging operation of the mechanism shown in FIG. 10.
Figure 12:
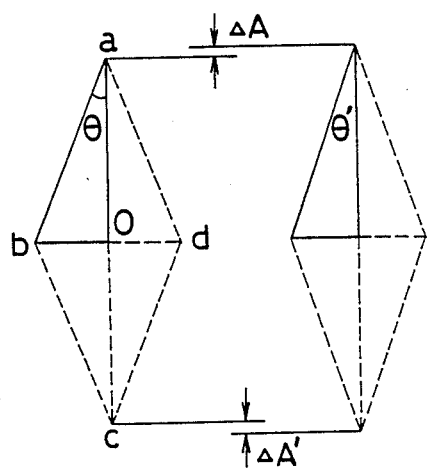

Now, the operation of the very small displacement enlargement mechanism having the above construction will be described with reference to FIGS. 10 to 13. FIG. 11 schematically shows the first movable member 54. This parallelogrammic member has its apices (a) to (d) formed with respective notches so that these apices serve the role of a hinge. The length of each of the sides ab, bd, dc and de is fixed at all time, and the piezoelectric element 53 is mounted such that it extends along the long diagonal ac, so that a change in the length of the diagonal ac appears as a change in the length of the diagonal bd. Further, since the triangles $\Delta abc$ and $\Delta adc$ are symmetrical with respect to the diagonal ac, a change in the length b0 with a change in the length of the diagonal ac is one half the change in the length of the diagonal bd. Further, a change in the length a0 when the triangle $\Delta ab0$ is considered is one half the change in the length of the diagonal ac.

On the basis of the above description, the enlarging function of the first movable member 54 will now be described with respect to one of the four triangles of the parallelogram, i.e., the triangle $\Delta ab0$. In FIG. 12(a), the solid line shows the state of the parallelogram without any change in the length of the long diagonal ac, i.e., when there is no applied voltage to the piezoelectric element 53. When a voltage is applied to the piezoelectric element 53, a dimensional strain is produced in the direction of arrow (A) in FIG. 10, so that the diagonal ac is slightly elongated by $\Delta A$ and $\Delta A'$ as shown by the solid line in FIG. 12(b). The displacement of the entirety of the element 53 produced at this time is $\Delta A + \Delta A'$. The left and right sides ab and bc are equal in length as noted above. Particularly, the angle $\angle ba0$ is 10 to 20 degrees, and the enlargement ratio was calculated in cases when the angle $\theta$ is 10 and 20 degrees, respectively. Assuming the length of the side ab to 10 mm and the elongation $\Delta A$ of the side a0 to be 0.01 mm, i.e., the overall displacement of the piezoelectric element 53 to be 0.02 mm, when $\theta = 20°$, the elongation of the diagonal bd was 0.054 mm corresponding to an enlargement ratio of 2.7. When $\theta = 10°$, the enlargement ratio was 5.7.

While the enlarging function of the first movable member 54 is as described above, the parallelogrammic mechanism is integral with the stationary frame 51a via the movable coupling section (d) and integral with the movable frame 52 in the movable coupling section (b) facing the movable coupling section (d), as noted above. Further, the movable frame 52 is coupled at the stem to the stationary frame 51 via the coupling section (e). Thus, a dimensional strain of the piezoelectric element 53 enlarged by the parallelogrammic mechanism is generated concentratedly at the movable coupling section (b) in the direction of arrow (B). Thus, the movable frame 52 is rotated about the movable coupling section (e) as a fulcrum. As a result, an enlarged displacement is generated in the coupling section (g) with the spring member 55. The enlargement ratio in this case is eg/eb. The enlarged displacement produced at the end of the movable frame 52 is further enlarged by the spring members 55 and 56 before being transmitted to the printing wire 57.

Figure 13:
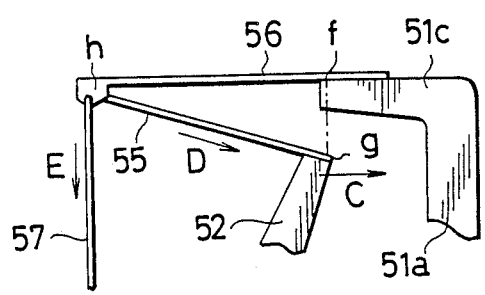

The enlarging function will now be described with respect to FIG. 13. When an enlarged displacement is produced in the direction of arrow(C) at the end of the movable frame 52, the spring 55 coupled thereto is moved in the direction of arrow (D). The other end of the spring member 55 is coupled to an end of the other spring member 56 in the coupling section (h), and the other end of the spring member 56 is coupled to the free end of the stationary frame 51a. The coupling sections (h), (f) and (g) of the spring members 55 and 56 form a single triangle. Thus, when a force is applied to the spring member 55 in the direction of arrow (D) with the coupling section (f) as a fulcrum, the component acts on the coupling section (h) in the direction of arrow (E). The enlargement ratio of the displacement at this time is fh/fg. In the above way, in this embodiment of the very small displacement enlargement mechanism the dimensional strain of the piezoelectric element 53 is progressively enlarged before being transmitted to the printing wire 57.

As is shown, in this embodiment of the very small displacement enlargement mechanism having the above enlarging function, like the previous embodiment, the stationary frames 51, 51a, movable frame 52 and first movable member 54 are formed from a single metal sheet, the piezoelectric element 53, stationary frame 51a, movable frame 52 and printing wire 57 are disposed parallel, the printing wire 57 is driven inwardly, and the movable frame 52 is driven toward the piezoelectric element 53. Therefore, the drive section, enlarging section and printing wire section are accommodated substantially in the same area. Thus, this embodiment of the very small displacement enlargement mechanism is extremely reduced in size compared to the prior art with the same size of the piezoelectric element 53.

Figure 14:
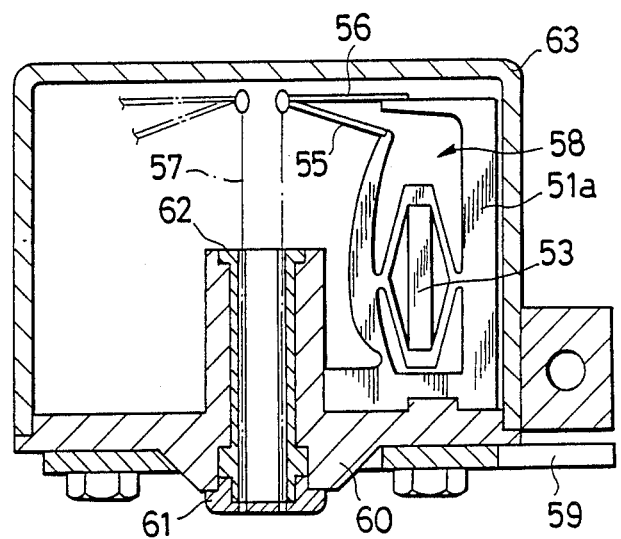
FIG. 14 is a sectional view showing a printing head using the mechanism shown in FIG. 10.

FIG. 14 shows a printing head using the above very small displacement enlargement mechanism. More specifically, a plurality of very small displacement enlargement mechanisms 58 are assembled in respective mounting grooves provided in a mounting base 60 on a printing-head mount 59. The individual printing wires 57 each have a portion from a central portion to the free ends supported by a guide member 62, and their free ends are arranged in two rows by a wire arrangement member 61. The printing wires are thus accommodated compactly compared to the prior art structure. Reference numeral 63 designates a printing head cover.

As a further effect of the second embodiment of the very small displacement enlargement mechanism, it is possible to improve the readiness of mounting of the piezoelectric element 53 in the enlarging mechanism. In FIG. 10, when mounting the piezoelectric element 53 by setting the dimension between the piezoelectric element mounting sections 54a and 54b of the first movable member 54 to be slightly smaller than the corresponding dimension of the piezoelectric element 53, inwardly acting external forces are applied to the movable coupling sections (d) and (b) on the short diagonal bd to increase the dimension between the mounting sections 54a and 54b to be greater than the length of the piezoelectric element 53. Thus, the piezoelectric element 53 can be readily mounted, and the piezoelectric element 53 can be held compressed by the elasticity of the parallelogrammic mechanism after mounting of the element 53. In this way, with this mechanism the piezoelectric element 53 can be readily mounted compared to the prior art mechanism.

As in the first embodiment, the shape of the parallelogrammic section of the first movable member 54 is by no means limited to a geometrically stringent parallelogram.

(Third Embodiment)

Figure 15:
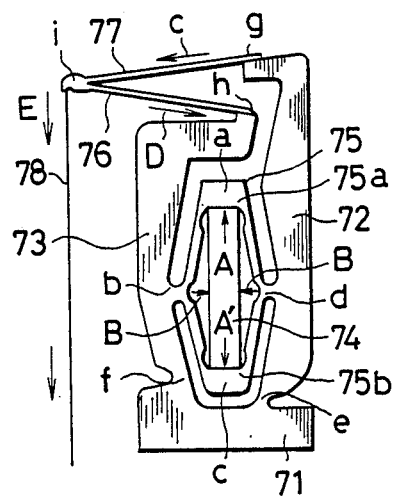
FIG. 15 is a side view showing a third embodiment of the very small displacement enlargement mechanism according to the invention.

FIG. 15 shows a third embodiment of the very small displacement enlargement mechanism according to the invention. In the Figure, reference numeral 71 designates a stationary frame made from a metal sheet as in the previous embodiments. To the stationary frame 71 are coupled via movable coupling sections (e) and (f) a first movable frame 72 as a first frame and a second movable frame 73 substantially V-shaped form as a second frame. A piezoelectric element 74 is mounted in a first movable member having a polygonal shape, for instance a substantially parallelogrammic shape. The first movable member 75 has mounting sections 75a and 75b provided at the opposed apices on the long diagonal and having respective parallel surfaces, and the piezoelectric element 74 is compressedly secured between the mounting sections 75a and 75b. One of the apices on the other diagonal of the first movable member 75 is coupled to the first movable frame 72 via the movable coupling section (d), and the other apex is coupled via the movable coupling section to the second movable frame 73 at a position symmetrical with respect to the movable coupling section (d). When a dimensional strain is produced in the piezoelectric element 74, a strain is generated laterally evenly in the movable coupling sections (b) and (d) of the first movable member 75. Thus, no impartial stress is produced in the piezoelectric element 74, and hence no bending stress is produced in the piezoelectric element 74. It is thus possible to prevent rupture of the piezoelectric element 74 and permit effective consumption of generated energy of the piezoelectric element 74.

The first and second movable frames 72 and 73 are rotatable about the movable coupling sections (f) and (e) as a fulcrum with displacement of movable coupling sections (b) and (d) of the first movable section 75 in the horizontal direction. A bar-like spring member 76 has one end coupled by soldering to the free end of the second movable frame 73 via a coupling section (h). Another spring member 77 has one end coupled by soldering to the free end of the first movable frame 72 via a coupling section (g) The other ends of the spring members 76 and 77 are coupled together in a coupling section (i), and a stem of a downwardly extending printing wire 78 is secured to the coupling section (i). The first and second movable frames 72 and 73 are formed together with the stationary frame 71 from a metal sheet. The spring members 76 and 77 may be made integral with the respective first and second movable frames 72 and 73.

Figure 16:
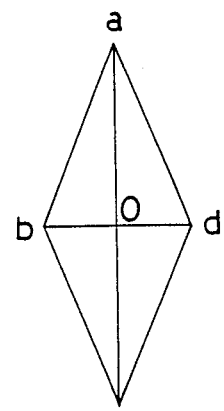
FIGS. 16 to 18 are views for explaining the principles of enlarging operation of the mechanism shown in FIG. 15.

The operation of the very small displacement enlargement mechanism will now be described with reference to FIGS. 15 to 19. FIG. 16 schematically shows the first movable member 75. This parallelogrammic member has its apices (a) to (d) formed with respective notches so that these apices serve the role of a hinge. The length of each of the sides ab, bc, cd and de is fixed at all times, and the piezoelectric element 74 is mounted such that it extends along the long diagonal ac, so that a change in the length of the diagonal ac appears as a change in the length of the diagonal bd. Further, since the triangles $\Delta abc$ and $\Delta adc$ are symmetrical with respect to the diagonal ac, a change in the length b0 with a change in the length of the diagonal ac is one half the change in the length of the diagonal bd. Further, a change in the length a0 when the tirangle $\Delta ab0$ is considered is one half the change in the length of the diagonal ac.

Figure 17:
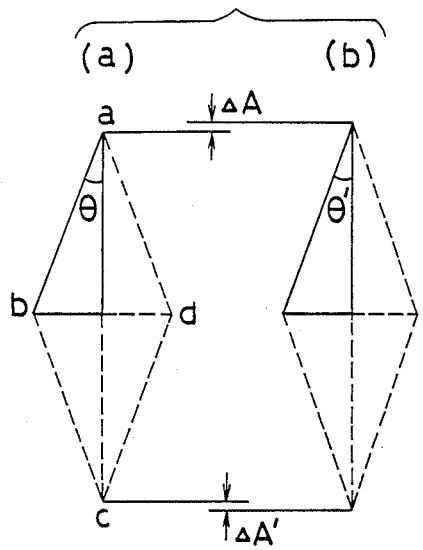
Figure 18:
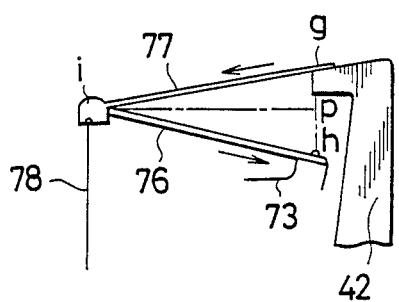

On the basis of the above description, the enlargement function of the first movable member 75 will now be described with respect to one of the four triangles of the parallelogram, i.e., the triangle $\Delta ab0$. In FIG. 17(a), the solid line shows the state of the parallelogram without any change in the length of the long diagonal ac i.e., when there is no applied voltage to the piezoelectric element 13. When a voltage is applied to the piezoelectric element 74, a dimensional strain is produced in the direction of arrow (A) in FIG. 17, so that the diagonal ac is slightly elongated by (A) and (A') as shown by solid line in FIG. 17(b). The displacement of the entirety of the element 74 produced at this time is ΔA+ΔA'. The left and right sides ab and bc are equal in length as noted above. Particularly, the angle ∠ba0 is 10 to 20°, and the enlargement ratio was calculated in case when is θ is 10° and 20°, respectively. Assuming the length of the side ab to be 10 mm and the elongation ΔA of the side a0 to be 0.01 mm, i.e., the overall displacement of the piezoelectric element 13 to be 0.02 mm, when θ=20°, the elongation of the diagonal bd was 0.054 mm corresponding to an enlargement ratio of 2.7. When θ=10°, the enlargement ratio was 5.7.

While the enlarging function of the parallelogrammic first movable member 75 is as described above, the parallelogrammic mechanism is integral with the first and second movable frames 72 and 73 in the movable coupling sections (b) and (d) as noted above, and the stems of the movable frames 72 and 73 are coupled to the stationary frame 71 via the movable coupling sections (e) and (f). Therefore, a dimensional strain of the piezoelectric element 74 in the direction of arrow (A) enlarged by the parallelogrammic mechanism is concentratedly generated in the movable coupling sections (b) and (d) in the direction of arrow (B). Thus, the first and second movable frames 72 and 73 are rotated about the respective movable coupling sections (e) and (f) as fulcrums, thus producing enlarged displacement of the coupling sections (g) and (h) at the end. The displacements produced at this time are suitably opposite in direction and equal in the extent. For this reason, the positions of the movable coupling sections (e) and (f) are shifted from each other such that the two enlargement ratios hf/bf and ge/de are equal.

The enlarged displacements of the ends of the first and second movable frames 72 and 73 are further enlarged by the spring sections 76 and 77 before being transmitted to the printing wire 78. This enlarging function will now be described with reference to FIG. 18. The moments given to the coupling sections (h) and (g) of the spring members 76 and 77 are equal and opposite in direction, so that they act with the line connecting the coupling sections (g) and (h) as arms of a couple to be concentrated at the coupling section (i) to be provided as moment in the direction of arrow (E). The enlargement ratio in this case is pi/ph or pi/pg for the mid point (p) of a line connecting the two points (g) and (h) can be thought to be an axis. The displacement that is generated in the coupling section (i) reaches as high as several ten times the dimensional strain of the piezoelectric element 74 as the source of displacement, and it is directly transmitted to the printing wire 78 united to the coupling section (i).

As has been described, the third embodiment of the enlargement mechanism is adapted to evenly divide the energy of displacement of the piezoelectric element 74 via the parallelogrammic mechanism, the divisions being transmitted to two levers acting in opposite directions. Thus, the strain or stress at each operating point or operating member of the mechanism is substantially divided into halves compared to the case of the prior art method. This naturally means prolongation of the life of the entire mechanism and reduction of the possibility of rupture. Further, equal and opposite moments can be obtained in the coupling sections (h) and (g) as output terminals of the mechanism, so that the couple can be smoothly enlargedly transmitted to the printing wire 78 via the spring members 76 and 77 coupled to these coupling sections.

(Fourth Embodiment)

Figure 19:
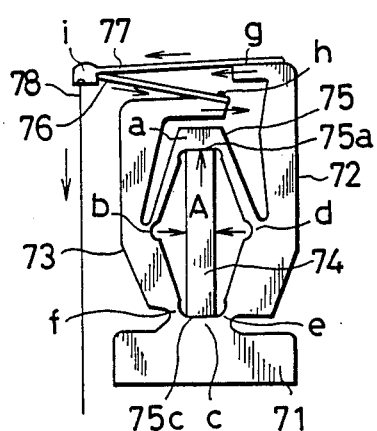
FIG. 19 is a side view showing a fourth embodiment of the very small displacement enlargement mechanism according to the invention.

FIG. 19 shows a fourth embodiment of the very small displacement enlargement mechanism according to the invention. Parts like those in the third embodiment are designated by like reference numerals. In the preceding third embodiment the first movable member 75 is moved independently when a dimensional strain of the piezoelectric element 74 is received. In this embodiment, two sides ed and bf of the lower half of the first movable member 75 are made integral with portions of and operable with the first and second movable frames 72 and 73. In other words, the opposite ends of the upper half of the first movable member 75 are coupled via movable coupling members (b) and (d) to the respective first and second movable frames 72 and 73.

This construction is simpler than that of the third embodiment, thus permitting easier mechanical processing and realization of a more inexpensive mechanism. Further, the number of notches serving as hinges is reduced, thus correspondingly reducing the waste of energy generated by the piezoelectric element 74 and improving the effect of the entire mechanism. In FIG. 19, other parts like those in FIG. 15 are designated by like reference numerals, with omission of their detailed description.

The enlarging function concerning the first movable member 75 in this embodiment is basically the same as that in the previous third embodiment. However, since the lower piezoelectric element mounting section 75b is a stationary end, so that the overall displacement of the piezoelectric element 74 is given to the upper piezoelectric element mounting section 75a as shown by arrow (A) in FIG. 19. At this time, the displacements of the movable coupling sections (b) and (d) with respect to the displacement of the peizoelectric element 74 are substantially the same as in the case of the third embodiment. In the third embodiment, however, the displacements of the movable coupling sections (b) and (d) are both produced inwardly on a line connecting these sections (b) and (d), whereas in the fourth embodiment the displacements are generated inwardly on arcs with radii ed and fb with the movable coupling sections (e) and (f) as fulcrums. However, although the displacements of the movable coupling sections (b) and (d) are enlarged, they are still small in extent, so that they can be regarded to be on the line connecting the movable coupling sections (b) and (d).

Further, in the previous third embodiment the displacement enlarged by the first movable member 75 is transmitted to the lever sections of the first and second movable frames 72 and 73 as independent displacements and enlarged as such. In this embodiment, the lower two sides ed and bf of the first movable member 75 constitute portions of the first and second movable frames 72 and 73.

Figure 20:
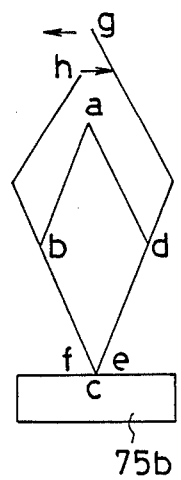
FIG. 20 is a view for explaining the principles of enlarging operation of the mechanism shown in FIG. 19.

More specifically, referring to FIG. 20 the first and second movable frames 72 and 73 are rotatable about the movable coupling members (e) and (f) as fulcrums by the enlarging mechanism of the first movable member 75 to generate enlarged displacements in the coupling sections (g) and (h). The enlargement ratios in this case are respectively eg/ed and fh/fb. In this embodiment, like the previous embodiment, the positions of the fulcrums are shifted such that equal and opposite moments are generated in the coupling sections (g) and (h) to obtain eg/ed =fh/fb.

In the third and fourth embodiments of the very small displacement enlargement mechanism having enlarging function, like the first and second embodiments, the stationary frame 71, first and second movable frames 72 and 73 and first movable member 75 are made from a single metal sheet, the piezoelectric element 74, first and second movable frames 72 and 73 and second movable frame 73 are disposed parallel, the printing wire 78 is driven inwardly, and the first and second movable frames 72 and 73 are driven toward the piezoelectric element 74. Thus, the drive section, enlarging section and driven section are substantially accommodated in the same area, thus permitting great size reduction.

Figure 21:
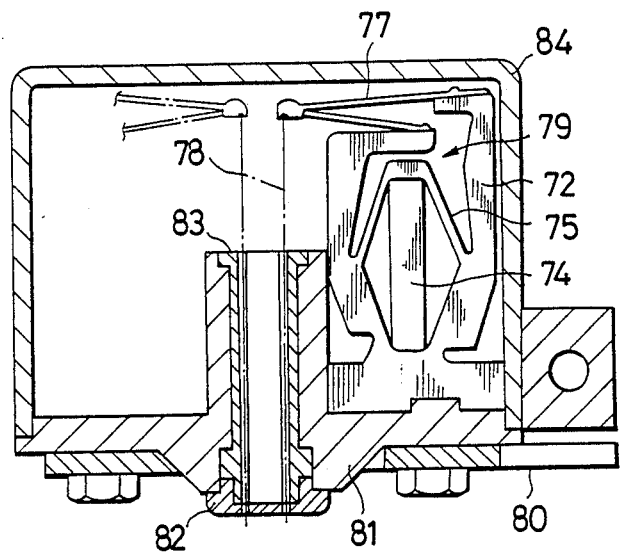
FIG. 21 is a sectional view showing a printing head using the mechanism shown in FIG. 19.

FIG. 21 shows a printing head using the fourth embodiment of the very small displacement enlargement mechanism. More specifically, a plurality of very small displacement enlargement mechanisms of this embodiment are assembled in respective mounting grooves provided in a printing-unit mounting base 81 of a printing-head mounting member 80. The individual printing wires 78 are compactly accommodated compared to the prior art structure with their intermediate portions guided by a guide member 83 and their free ends arranged in two rows by a wire arrangement member 82. Reference numeral 84 designates a printing head cover. The third and fourth embodiments of the very small displacement enlargement mechanism, like the second embodiment, permit ready mounting of the piezoelectric element.

(Fifth Embodiment)

Figure 22:
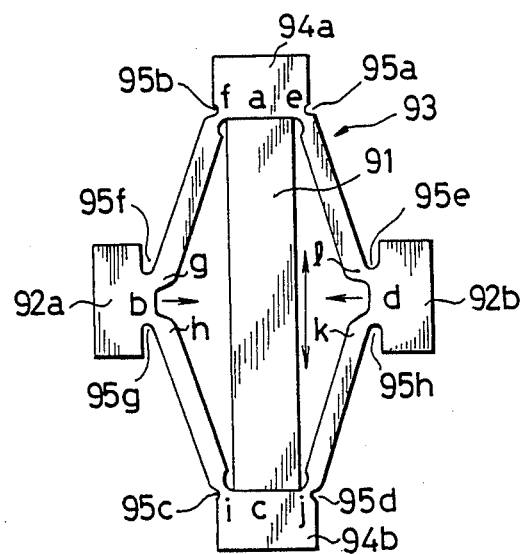
FIG. 22 is a side view showing a fifth embodiment of the very small displacement enlargement mechanism.

FIG. 22 shows a fifth embodiment of the very small displacement enlargement mechanism. In this embodiment, a dimensional strain of a piezoelectric element 91 in the longitudinal direction is enlarged by an enlarging member 93 made from a metal member having a large modulus of elasticity, for instance a steel member for a spring, so that an enlargement output is provided from output sections 92a and 92b in a direction toward the piezoelectric element 91. The enlarging member 93 includes four elements (or links) fg, hi, jk and el arranged in the form of a closed loop, for instance a substantially parallelogrammic link, and is provided with a pair of mounting sections 94a and 94b and a pair of output sections 92a and 92b symmetrically arranged with respect to the piezoelectric element 91. The mounting sections 94a and 94b are provided at opposed apices (a) and (c) on a long diagonal of the enlarging member 93 and have respective parallel surfaces. The piezoelectric element 91 is compressedly secured between the mounting sections 94a and 94b. The output sections 92a and 92b are provided at opposed apices (b) and (d) on the other diagonal. Coupling sections (e) to (1) of the output sections 92a and 92b and mounting sections 94a ahd 94b are provided with respective notches 95a to 95h which serve as hinges.

In this embodiment of the very small displacement enlargement mechanism, the distance between the notch sections 95f and 95g and between notches 95e and 95h in the output sections 92a and 92b is set to be smaller than the distance between the notches 95b and 95c and between notches 95a and 95d in the mounting sections 94a and 94b, and a dimensional strain of the piezoelectric element 91 transmitted to the mounting sections 94a and 94b crosses perpendicularly to the direction of displacement of the piezoelectric element 91 in the output sections 92a and 92b and is enlargedly outputted in a direction toward the piezoelectric element 91.

Figure 23:
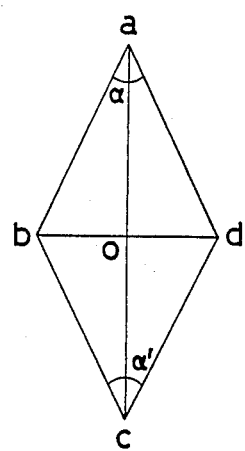
FIG. 23 is a schematic view for explaining the enlarging operation of the mechanism shown in FIG. 1.

FIG. 23 is a schematic view for explaining the principles of enlargement of the enlarging member 93 shown in FIG. 22. The sides ab, bc, cd and da have a fixed and equal length, and the piezoelectric element 91 is mounted such that it extends along the long diagonal ac. Thus, a displacement of the peizoelectric element 91 constitutes a change in the length of the diagonal ac. This change appears as a change in the angles $\alpha$ and $\alpha'$ of the apices (a) and (c), and hence as a change in the length of the diagonal bd. The triangles $\Delta$abc and $\Delta$adc are symmetrical with respect to the diagonal ac, and also the triangles $\Delta$abd and $\Delta$cbd are symmetrical with respect to the diagonal bd. Thus, a change in b0 produced with a change in the length of the diagonal ac is one half the change in the length of the diagonal bd. Also, a change in the length of the side a0 when the triangle $\Delta$ab0 is considered is one half the change in the length of the diagonal ac.

On the basis of the above, the enlarging function of the very small displacement enlargement mechanism will be described in conjunction with one of the four triangles constituting the parallelogram, for instance the triangle $\Delta$abc.

Figure 24:
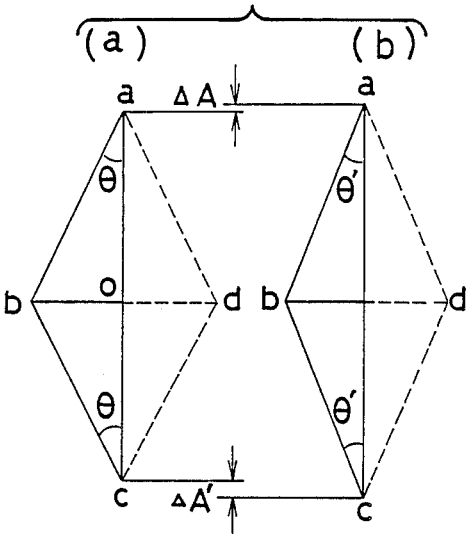
FIG. 24 is a view for explaining the enlargement ratio of the mechanism shown in FIG. 24.

Shown in FIG. 24(a) is the state of the parallelogrammic mechanism without any dimensional strain produced in the piezoelectric element 91 extending along the long diagonal ac. Shown in the FIG. 24(b) is the state with a dimensional strain produced with voltage application to the element 91. In this state, the side ac is elongated by $\Delta A$ and $\Delta A'$ in the upper and lower directions, respectively ($\Delta A = \Delta A'$).

As noted above, the sides ab and bc are equal and constant. Thus, a change in the length of the diagonal ac is a change in $\theta$ and a change in the angle $\angle$abc, that is, it appears as a change in the length of the side b0 corresponding to the height of the triangle $\Delta$abc. In this case, the ratio of a change in the length of the side b0 with respect to a change in the length of the side ac varies greatly depending on the setting of $\theta$, the greater it is the smaller $\theta$. Practically, $\theta$ is about 10° to 20°. With $\theta = 20°$, the enlargement ratio is approximately 2.7, and with $\theta = 10°$ it is approximately 5.7.

The enlarging member 93 is not limited to a geometrically stringent parallelogram, and slight modifications thereof are covered. In general, any shape may be adopted so long as a dimensional strain of the piezoelectric element 91 is generated in a transversal direction with respect to the element 91.

Figure 25:
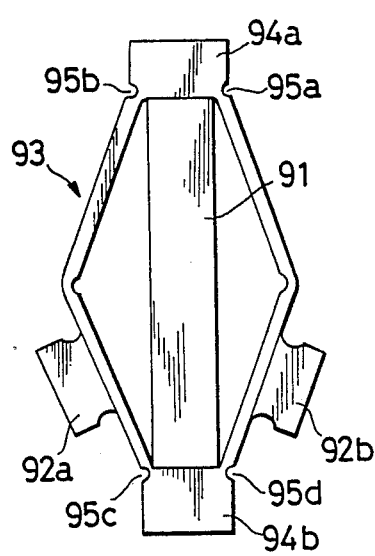
FIG. 25 is a side view showing a modification of the fifth embodiment.

While in this embodiment the output sections 92a and 92b are provided at the apices (b) and (d) of the enlarging member 93, it is possible to provide an output section at each link as shown in FIG. 25 for utilizing angular displacement of the link member.

Figure 26:
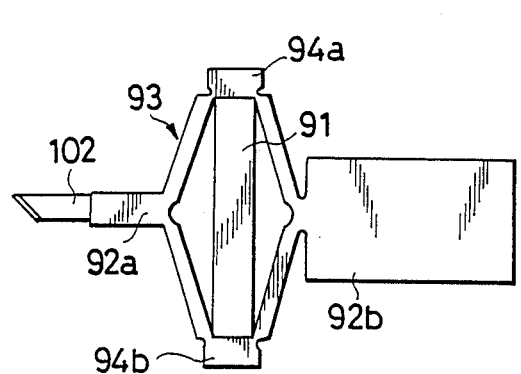
FIGS. 26 and 27 are side views showing an example of application of the mechanism shown in FIG. 22.

FIG. 26 shows an example of application of the very small displacement enlargement mechanism in FIG. 22 at all. The piezoelectric element 91 is vibrated by applying a pulse voltage to it, and the vibrations are taken out after enlargement to the output section 92a to cause vibrations of a tool 102 such as a cutter mounted on the output section 92a. The vibrations can improve the machining efficiency of the tool 102.

Figure 27:
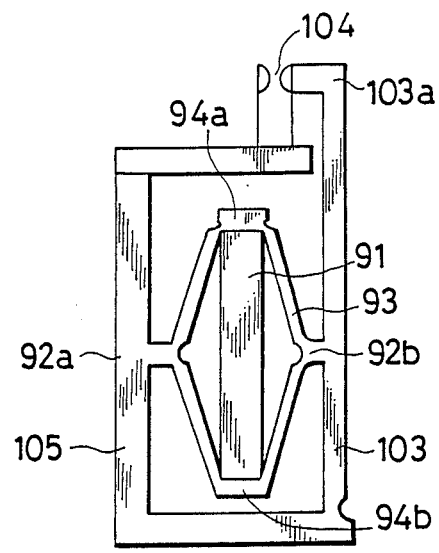

FIG. 27 shows another example of application, in which a relay switch 104 making use of a lever portion 103 is provided in the second stage. More specifically, the output section 92a of the enlarging mechanism shown in FIG. 22 is secured to a stationary frame 105, and the output section 92b is coupled to the lever portion 103. In this structure, an enlarged displacement produced in the output section 92b is provided after further enlargement from an end 103a of the lever portion 103, and this enlarged output operates the relay switch 104.

The very small displacement enlargement mechanism shown in FIGS. 22 and 25 is of course applicable to an enlargement mechanism for driving a wire-dot printer wire.

As has been shown, this embodiment of the very small displacement enlargement mechanism has an entirely integral structure so that it can be readily manufactured. Besides, it has a rigid structure. Further, since an output can be taken out in a lateral direction with respect to the direction of generation of strain in the piezoelectric element 91, in an enlargement mechanism combination with a plurality of stages as shown in FIG. 27, a second enlarging section can be disposed parallel to the piezoelectric element 91, so that a compact structure can be obtained.

Further, in this very small displacement enlargement mechanism the enlarging members 93 and 101 are elastic members and in the form of a closed loop, so that they are extremely high in elasticity and hence can be readily deformed and restored. For this reason, the assembly of the mechanism, i.e., the mounting and adjustment of the piezoelectric element 91, can be very readily done.

Figure 28:
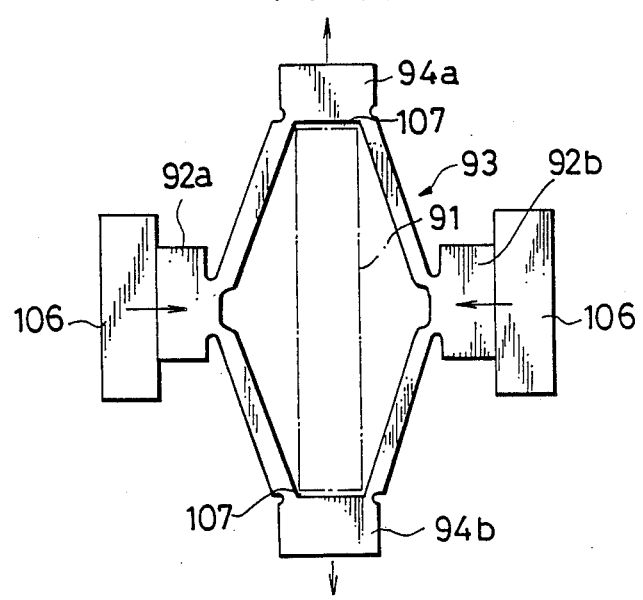
FIG. 28 is a view for explaining a method of mounting a piezoelectric element in the mechanism shown in FIG. 22.
Figure 29:
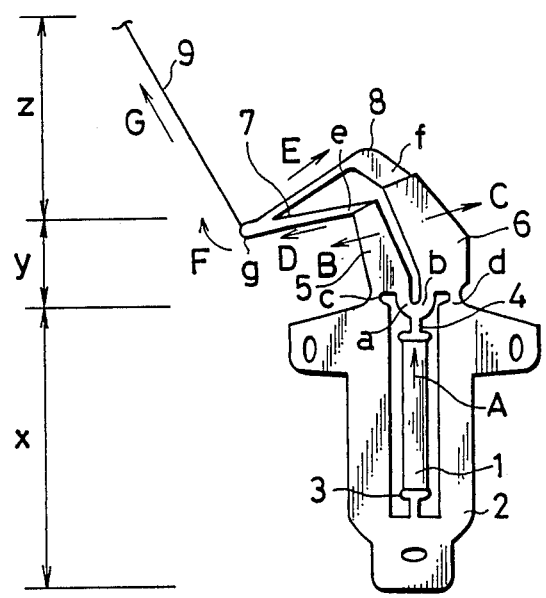
FIG. 29 is a side view showing a prior art very small displacement enlargement mechanism.

A method of mounting the piezoelectric element 91 will now be described. In the enlarging mechanism shown in FIG. 22, a distance between the mounting sections 94a and 94b of the enlarging member 93 is formed to be slightly smaller than the longitudinal dimension of the piezoelectric element 91. When mounting the element 91, external forces are applied inwardly to the two output sections 92a and 92b using a vice 106 as shown in FIG. 28 to increase the distance between the mounting sections 94a and 94b to such an extent that a gap 107 is produced between each mounting section and each end of the piezoelectric element 91. In this state, the piezoelectric element 91 is inserted into the space between the mounting sections 94a and 94b. Subsequently, the external force is removed, whereby the enlarging member 93 is restored, and as a consequence the piezoelectric element 91 is compressedly secured between the mounting sections 94a and 94b. In this way, the piezoelectric element 91 can be readily mounted, and the adjustment of the compressing force can be obtained automatically.

In the embodiment of FIGS. 22 and 25, the enlarging members 93 and 101 are formed to be in the form of a symmetrical loop with respect to the piezoelectric element 91. However, it is possible to form asymmetric enlarging members with respect to the piezoelectric element 91.

While some preferred embodiments of the invention has been described, they are by no means limitative, and various changes and modifications are possible without departing from the scope of the invention.

What is claimed is:

1. A printing head comprising a printing unit having a plurality of very small displacement enlargement mechanisms, said very small displacement enlargement mechanisms comprising:

a piezoelectric element having a longitudinal axis for generating a dimensional strain along the longitudinal axis according to an applied voltage, to thereby effect a change in its length; and a deformable enlarging member including:

a pair of mounting sections;

a pair of links which are formed substantially straight from rigid material and disposed on opposite sides of the piezoelectric element with respect to the longitudinal axis thereof, each of said rigid links having two ends and being resiliently hinged at said two ends to said pair of mounting sections respectively and having an intermediate hinge portion at which said rigid links are resiliently bent according to said change in length of the piezoelectric element, each of said paired links having a link portion between the intermediate hinge portion of the corresponding link and one of said mounting sections, said link portions of both links being disposed opposite to each other with respect to the longitudinal axis of the piezoelectric element;

a pair of output sections provided on said respective link portions; and said pair of mounting sections, rigid links and output sections being integrally formed so as to allow resilient deformation of the enlarging member;

said enlarging member engaging said piezoelectric element in a state that the enlarging member encircles the piezoelectric element in a closed loop and resiliently holds the respective ends of the piezoelectric element to be in compression by said pair of mounting sections, whereby said change in length of the piezoelectric element is transferred to the enlarging member which is placed in its deformation to output an amplified motion of the enlarging member through said output sections;

said enlarging member having four points corresponding to four apices of a parallelogram respectively, said pair of mounting sections being positioned at two points of said four points corresponding to two apices of said four apices respectively, which two apices are located diagonally opposite to each other, and said intermediate hinge portions of said links being positioned at other two points of said four points corresponding to other two apices of said four apices respectively, which other two apices are located diagonally opposite to each other, said printing head further comprising:

a printing-unit mounting member having a hollow cylindrical shape with a bottom and an inner peripheral surface, said mounting member further having a plurality of radially spaced-apart mounting grooves formed at least in said inner peripheral surface, and a cylindrical guide portion formed on the bottom along a central axis of the printing-unit mounting member;

said printing unit being mounted on said printingunit mounting member in a state that said first frame of the displacement enlargement mechanism is fitted in said corresponding mounting groove; and said drive section of the displacement enlargement mechanism being a printing wire which is connected at its proximal end thereof to said output section and is guided at its extending portion thereof by said cylindrical guide portion in a state that said extending portion of the printing wire extends along said central axis of the printing-unit mounting member.

2. The printing head according to claim 1, wherein said printing-unit mounting member has an upper end surface which is provided with grooves, and said first frame of the displacement enlargement mechanism is provided at its side surface thereof with a projection which is engaged into said corresponding groove when said printing unit is mounted on the printing-unit mounting member.

3. A printing head comprising a printing unit having a plurality of very small displacement enlargement mechanism, said very small displacement enlargement mechanisms comprising:

a piezoelectric element having a longitudinal axis for generating a dimensional strain along the longitudinal axis according to an applied voltage, to thereby effect a change in its length; and a deformable enlarging member including:

a pair of mounting sections;

a pair of links which are formed substantially straight from rigid material and disposed on opposite sides of the piezoelectric element with respect to the longitudinal axis thereof, each of said rigid links having two ends and being resiliently hinged at said top ends to said pair of mounting sections respectively and having an intermediate hinge portion at which said rigid links are resiliently bent according to said change in length of the piezoelectric element, each of said paired links having a link portion between the intermediate hinge portion of the corresponding link and one of said mounting sections, said link portions of both links being disposed opposite to each other with respect to the longitudinal axis of the piezoelectric element;

a pair of output sections provided on said respective link portions; and said pair of mounting sections, rigid links and output sections being integrally formed so as to allow resilient deformation of the enlarging member;

said enlarging member engaging said piezoelectric element in a state that the enlarging member encircles the piezoelectric element in a closed loop and resiliently holds the respective ends of the piezoelectric element to be in compression by said pair of mounting sections whereby said change in length of the piezoelectric element is transferred to the enlarging member which is placed in its deformation to output an amplified motion of the enlarging member through said output sections;

said enlarging member having four points corresponding to four apices of a parallelogram respectively, said pair of mounting sections being positioned at two points of said four points corresponding to two apices of said four apices respectively, which two apices are located diagonally opposite to each other, and said intermediate hinge portions of said links being positioned at other two points of said four points corresponding to other two apices of said four apices respectively, which other two apices are located diagonally opposite to each other, said printing head further comprising:

a printing-unit mounting member having a hollow cylindrical shape with a bottom and an inner peripheral surface, said mounting member further having a plurality of radially spaced-apart mounting grooves formed in said bottom thereof, and a cylindrical guide portion mounted on the bottom along a central axis of the printing-unit mounting member;

said printing unit being mounted on said printingunit mounting member in a state that said stationary frame of the displacement enlargement mechanism is fitted in said corresponding mounting grooves; and said drive section of the displacement enlargement mechanism being a printing wire which is connected at its proximal end thereof to said output sections and is guided at its extending portion thereof by said cylindrical guide portion in a state that said extending portion of the printing wire extends along said central axis of the printing-unit mounting member.

4. A very small displacement enlargement mechanism comprising:

a piezoelectric element having a longitudinal axis for generating a dimensional strain along the longitudinal axis according to an applied voltage, to thereby effect a change in its length; and a deformable enlarging member including:

a pair of mounting sections;

a pair of links which are formed substantially straight from rigid material and disposed on opposite sides of the piezoelectric element with respect to the longitudinal axis thereof, each of said rigid links having two ends and being resiliently hinged at said two ends to said pair of mounting sections respectively and having an intermediate hinge portion at which said rigid links are resiliently bent according to said change in length of the piezoelectric element, each of said paired links having a link portion between the intermediate hinge portion of the corresponding link and one of said mounting sections, said link portions of both links being disposed opposite to each other with respect to the longitudinal axis of the piezoelectric element;

a pair of output sections provided on said respective link portions; and said pair of mounting sections, rigid links and output sections being integrally formed so as to allow resilient deformation of the enlarging member;

said enlarging member engaging said piezoelectric element in a state that the enlarging member encircles the piezoelectric element in a closed loop and resiliently holds the respective ends of the piezoelectric element to be in compression by said pair of mounting sections, whereby said change in length of the piezoelectric element is transferred to the enlarging member which is placed in its deformation to output an amplified motion of the enlarging member through said output sections;

said enlarging member having four points corresponding to four apices of a parallelogram respectively, said pair of mounting sections being positioned at two points of said four points corresponding to two apices of said four apices respectively, which two apices are located diagonally opposite to each other, and said intermediate hinge portions of said links being positioned at other two points of said four points corresponding to other two apices of said four apices respectively, which other two apices are located diagonally opposite to each other.

5. A very small displacement enlargement mechanism comprising:

a piezoelectric element having a longitudinal axis and operable to generate a dimensional strain along the longitudinal axis according to an applied voltage, to thereby effect a change in its length, said element having first and second ends along the longitudinal axis thereof;

a stationary frame to which said first end of the piezoelectric element is secured;

first and second movable frames disposed on opposite sides of said piezoelectric element with respect to the longitudinal axis thereof and provided with respective base ends and output ends, said base ends of the first and second movable frames being hinged to said stationary frame at opposite sides of the stationary frame respectively;

a movable member having a mounting section to which said second end of the piezoelectric element is secured and which has two ends, said movable member further having first and second movable elements which are hinged to said respective ends of the mounting section and disposed on opposite sides of the piezoelectric element with respect to the longitudinal axis thereof in a state that both movable elements extend toward said first end of the piezoelectric element and are hinged to said first and second frames respectively;

said movable member receiving said change in length of the piezoelectric element to be placed in motion thereby;

said first and second frames receiving said motion of the movable member for displacement relative to each other, thereby amplifying the motion of the movable member;

said first and second output ends coming closer to each other upon said relative displacement of the first and second frames;

an output section connected to said first and second output ends to output the motion of the movable member amplified by said first and second frames; and a drive section connected to said output section for receiving said amplified motion of the movable member from the output section.

6. A very small displacement enlargement mechanism comprising:

a piezoelectric element having a longitudinal axis and operable to generate a dimensional strain along the longitudinal axis according to an applied voltage to thereby effect a change in its length, said element having first and second ends along the longitudinal axis thereof;

a movable member encircling said piezoelectric element and receiving said change in length of the piezoelectric element to be placed in motion thereby, said movable member having a pair of mounting sections to which said first and second ends of the piezoelectric element are secured respectively, and first and second movable elements each of which has two ends hinged to the corresponding mounting sections respectively and an intermediate hinge portion through which each of the movable elements is bendably moved;

said first and second movable elements being disposed on opposite sides of the piezoelectric element with respect to the longitudinal axis of the piezoelectric element;

a stationary frame disposed close t said first end of the piezoelectric element;

first and second movable frames disposed on opposite sides of the piezoelectric element with respect to the axis thereof in a state that said movable member is interposed between both the first and second frames;

said each of first and second movable frames having a proximal end hinged to said stationary frame, a digital output and extending toward said second end of the piezoelectric element and a connecting portion between said proximal and distal output ends, said connecting portion of each of the first and second frames being hinged to said intermediate hinge portion of the respective first and second movable element, thereby to receive said motion of the movable member for displacement relative to each other, thereby amplifying the motion of the movable member;

said first and second output ends coming closer to each other upon said relative displacement of the first and second frames;

an output section connected to said first and second output ends to output the motion of the movable member amplified by said first and second frames; and a drive section connected to said output section for receiving said amplified motion of the movable member from the output section.

7. A very small displacement enlargement mechanism comprising:

a piezoelectric element having a longitudinal axis and operable to generate a dimensional strain along the longitudinal axis according to an applied voltage, to thereby effect a change in its length, said element having first and second ends along the longitudinal axis thereof;

a movable member encircling said piezoelectric element and receiving said change in length of the piezoelectric element to be placed in motion thereby, said movable member having a pair of mounting sections to which said first and second ends of the piezoelectric element are secured respectively, and first and second movable elements each of which has two ends hinged to the corresponding mounting sections respectively and an intermediate hinge portion through which each of the movable elements is bendably moved;

said first and second movable elements being disposed on opposite sides of the piezoelectric element with respect to the longitudinal axis thereof;

a stationary frame disposed close to said first end of the piezoelectric element;

first and second frames disposed on opposite sides of the piezoelectric element with respect to the longitudinal axis thereof in a state that said movable member is interposed between the first and second frames;

said first frame having a proximal end connected to said stationary frame to be united integrally and substantially in L-shaped form, a distal output end extending toward said second end of the piezoelectric element and a connecting portion between said proximal end and distal output end, said connecting portion of the first frame being hinged to said intermediate hinge portion of the first movable element;

said second frame having a proximal end hinged to said stationary frame, a distal output end extending toward said second end of the piezoelectric element and a connecting portion between said proximal and distal output ends, said connecting portion of the second frame being hinged to said intermediate hinge portion of the second movable element;

said first and second output ends coming closer to each other upon said relative displacement of the first and second frames;

an output section connected to said first and second output ends to output the motion of the movable member amplified by said first and second frames; and a drive section connected to said output section for receiving said amplified motion of the movable member from the output section.

8. A very small displacement enlargement mechanism comprising:
- a piezoelectric element having a longitudinal axis and operable to generate a dimensional strain along the longitudinal axis according to an applied voltage to thereby effect a change in its length, said element having first and second ends along the longitudinal axis thereof;
- a movable member encircling said piezoelectric element and receiving said change in length of the piezoelectric element to be placed in motion thereby, having first and second mounting sections to which said first and second ends of the piezoelectric element are secured respectively, and further having first and second movable elements which are hinged to said first and second mounting sections respectively and disposed on opposite sides of the piezoelectric element with respect to the longitudinal axis thereof, each of said first and second movable elements having an intermediate hinge portion through which each of the first and second movable elements is bendably moved;
- a stationary frame integrally connected to said first mounting section of the movable member;
- first and second frames receiving said motion of the movable member for displacement relative to each other, thereby amplifying the motion of the movable member;
- said first frame being disposed on one side of the piezoelectric element with respect to the longitudinal axis thereof in a state that said first movable element is interposed between the first frame and the piezoelectric element, and being connected integrally to the first movable element at a position between said intermediate hinge portion of the first movable element and said first mounting section, said first frame having a first output end;
- said second frame being disposed on the other side of the piezoelectric element with respect to the longitudinal axis thereof in a state that said second movable element is interposed between the second frame and the piezoelectric element, and being connected integrally to the second movable element at a position between said intermediate hinge portion of the second movable element and said first mounting section, said second frame having a second output end;
- said first and second output ends coming closer to each other upon said relative displacement of the first and second frames;
- an output section connected to said first and second output ends to output the motion of the movable member amplified by said first and second frames; and
- a drive section connected to said output section for receiving said amplified motion of the movable member from the output section.

9. A very small displacement enlargement mechanism comprising:
- a peizoelectric element having a longitudinal axis for generating a dimensional strain along the longitudinal axis according to an applied voltage, to thereby effect a change in its length; and a deformable enlarging member including:
- a pair of mounting sections;
- a pair of links which are formed substantially straight from rigid material and disposed on opposite sides of the piezoelectric element with respect to the longitudinal axis thereof, each of said rigid links having two ends and being resiliently hinged at said two ends to said pair of mounting sections respectively and having an intermediate hinge portion at which said rigid link is resiliently bent according to said change in length of the piezoelectric element;
- a pair of output sections each provided at said intermediate hinge portion of the corresponding links; and
- said pair of mounting sections, rigid links and output sections being integrally formed so as to allow resilient deformation of the enlarging member;
- said enlarging member engaging said piezoelectric element in a state that the enlarging member encircles the piezoelectric element in a closed loop and resilient hold the respective ends of the piezoelectric element to be in compression by said pair of mounting sections, whereby said change in length of the piezoelectric element is transferred to the enlarging member which is placed in its deformation to output an amplified motion of the enlarging member through said output sections;
- said enlarging member having four points corresponding to four apices of a parallelogram respectively, said pair of mounting sections being positioned at two points of said four points corresponding to two apices of said four apices respectively, which two apices are located diagonally opposite to each other, and said intermediate hinge portions of said links being positioned at the other two points of said four points corresponding to the other two apices of said four apices respectively, which other two apices are located diagonally opposite to each other.

10. A very small displacement enlargement mechanism comprising:
- a piezoelectric element having a longitudinal axis and two ends along the longitudinal axis, said piezoelectric element generating a dimensional strain along the longitudinal axis according to an applied voltage, to thereby effect a change in its length;
- a pair of mounting sections to which said piezoelectric element is mounted at said two ends to as to be in compression;
- a pair of output sections provided on opposite sides of said piezoelectric element with respect to the longitudinal axis thereof, each of said output sections having a predetermined length;
- a plurality of rigid links hinged to said pair of mounting sections and said pair of output sections in a form of loop encircling said piezoelectric element;
- said plurality of rigid links, pair of mounting sections and pair of output sections being formed integrally; and
- said length of each of said output sections being smaller than a distance between said pair of mounting sections so that each of said output sections moves closer toward the piezoelectric element when the piezoelectric element generates the dimensional strain, thereby to output an amplifying motion through the output sections.

11. A very small displacement enlargement mechanism comprising:

a piezoelectric element having a longitudinal axis and operable to generate a dimensional strain along the longitudinal axis according to an applied voltage to thereby effect a change in its length;

a movable member encircling said piezoelectric element and receiving said change in length of the piezoelectric element to be placed in motion thereby, said movable member having a pair of mounting sections to which said piezoelectric element is secured, and first and second movable elements each of which has two ends hinged to the corresponding mounting sections respectively and an intermediate hinge portion through which each of the first and second movable elements is bendably moved;

said first and second movable elements being disposed on opposite sides of the piezoelectric element with respect to the longitudinal axis thereof;

a first stationary frame and a second movable frame which receives said motion of the movable member for displacement relative to each other, thereby amplifying the motion of the movable member;

said first stationary frame having a first output end and being disposed on one side of the piezoelectric element with respect to the longitudinal axis thereof in a state that said first movable element is interposed between the first stationary frame and the piezoelectric element, said first stationary frame having a portion integrally connected to the first movable element;

said second movable frame having a second output end and being disposed on the other side of the piezoelectric element with respect to the longitudinal axis thereof in a state that said second movable element is interposed between the second movable frame and the piezoelectric element, said second movable frame having a portion integrally connected to the second movable element;

said first and second output ends coming closer to each other upon said relative displacement of the first and second frames;

an output section connected to said first and second output ends to output the motion of the movable member amplified by said first and second frames; and a drive section connected to said output section for receiving said amplified motion of the movable member from the output section.

12. The very small displacement enlargement mechanism according to claim 11, wherein said first stationary frame has a substantially L-shaped form provided with a portion which is extended around one end of said piezoelectric element.

13. The very small displacement enlargement mechanism according to claim 11, wherein said movable member has four points corresponding to four apices of a parallelogram respectively, said pair of mounting sections are positioned at said two points corresponding to opposed two apices of said parallelogram respectively, and said intermediate hinge portions of said first and second movable elements are positioned at said other two points corresponding to the other opposed two apices of said parallelogram respectively.

14. The very small displacement enlargement mechanism according to one of claims 11, 12, 5, 6, 7 or 8, wherein said drive section is a printing wire disposed substantially parallel to said piezoelectric element.

* * * * *